INVENTOR.
ARTHUR ORENBERG 3,042,878
FREQUENCY CONTROL APPARATUS FOR AN ATOMIC BEAM TUBE
Arthur Orenberg, Lexington, Mass., assignor to National Company, Inc., Melrose, Mass., a corporation of Massachusetts
Filed Oct. 3, 1960, Ser. No. 59,925
4 Claims. (Cl. 331—3)

This invention relates to automatic frequency controls for frequency standards and more particularly it is concerned with apparatus for automatically tuning an electronic flywheel oscillator to the resonance frequency of an atomic beam tube or the like.

Because of their extremely high stability and demonstrated practical merit, frequency standards which depend upon atomic resonance phenomena have come into relatively wide use considering the current nature of their development. Conventional apparatus of this kind features an atomic beam tube and an associated detector which provides an output voltage of variable magnitude depending upon the frequency of an applied RF signal. At the true resonance frequency of the beam tube, an output voltage maximum occurs so that angle modulation of the applied RF signal, that is frequency or phase modulation, introduces an A.C. voltage component into the detector output which increases as the displacement between the applied signal center frequency and the fixed beam tube resonance frequency increases. When the two frequencies coincide, however, then this component, which has the same frequency as the modulating signal, disappears.

To automatically tune the RF signal center frequency to the resonance frequency of the beam tube, this A.C. component is used to energize a servo motor which also has the modulation signal itself applied thereto as a reference. The servo motor in turn is adapted to mechanically tune an oscillator which bears a fixed frequency relation to the applied RF signal. In consequence, the servo motor drives the oscillator to the frequency required to obtain an applied RF signal frequency equal to the resonance frequency of the beam tube whereupon a null balance is effected.

When such conventional apparatus is placed in operation initially, it is often difficult to establish the correct oscillator frequency because of the fact that the detector output voltage characteristic, that is the direct output voltage from the detector as a function of the applied signal frequency, exhibits a number of maxima, and a null balance can occur at other than the central maximum which corresponds to the true resonance frequency of the beam tube. In the past, various schemes have been used to overcome this difficulty with varying degrees of success. It is known, for example, that a second harmonic component is also produced in the detector output which has a maximum amplitude at the true resonance frequency. Accordingly, a common practice has been to tune the oscillator manually with regard to a meter which is adapted to indicate substantially only the magnitude of the second harmonic component. A disadvantage of this scheme is that the second harmonic also exhibits a number of maxima at frequencies other than the true resonance frequency and at those maxima which are nearest in frequency to the resonance frequency, the value of the second harmonic is only slightly less than the maximum value obtained at resonance. A further complication arises from the fact that the detector output level can vary considerably with age and operating environment so that by itself, the absolute value of the second harmonic component does not provide a reliable indication of resonance frequency.

Quite a different scheme is disclosed in the copending application of Walter A. Mainberger Serial No. 744,729, filed June 26, 1958, now Patent No. 2,960,663 and entitled Frequency Control Apparatus. The basis for determining resonance frequency according to this scheme is the phase relation between the modulating signal and the fundamental detector output signal having the same frequency as the modulating signal. That is to say, only at the true resonance frequency do both the in-phase and quadrature components of the fundamental vanish, whereas individually these components exhibit a number of non-coincident zero crossings. A switching arrangement whereby the comparative effects that the in-phase and quadrature components have one certain operational aspects of the apparatus is used to take advantage of this fact. However, a drawback of this scheme is that a rather detailed manual adjustment procedure is required to establish the in-phase and quadrature components and to compare their effects before an automatic mode of operation can be finally instituted.

The object of the present invention, therefore, is to provide improved apparatus for placing an atomic frequency standard in operation at the true resonance frequency of the beam tube automatically.

A further object is to provide apparatus of the above-mentioned character which does not add appreciably to the complexity of the frequency standard.

The novel features of the invention together with further objects and advantages thereof will become apparent from the following detailed description of a preferred embodiment and the drawing to which it refers.

In the drawings, FIG. 1(a) is a graphical representation of the variation in the amplitude of the direct output voltage from the beam tube detector when an unmodulated RF signal having a frequency which varies over a relatively wide band is applied to the beam tube;

FIG. 1(b) is a graphical representation of the alternating voltage component in the output of the beam tube detector as a function of applied RF signal frequency for the same wide band of frequencies encompassed in FIG. 1(a) but with angle modulation of the RF signal at a frequency corresponding to that of the alternating voltage component and at a level high enough to cause the frequency deviation to be approximately equal to half the pedestal width. FIG. 1(c) is a graphical representation of the alternating voltage component from the beam tube detector having a frequency which is twice that of the modulating signal when the applied RF signal is as described in connection with FIG. 1(b). FIG. 1(d) is a graphical representation of the alternating voltage component in the detector output having the same frequency as the modulating signal when the applied RF signal frequency is varied over a relatively narrow band and when the angle modulation is low enough to cause the frequency deviation to be approximately equal to half the Ramsey line width as is the case during normal system operation. The shaded portions of the graph represent signals of opposite polarity from the signals represented by the unshaded portions;

Figure 1:
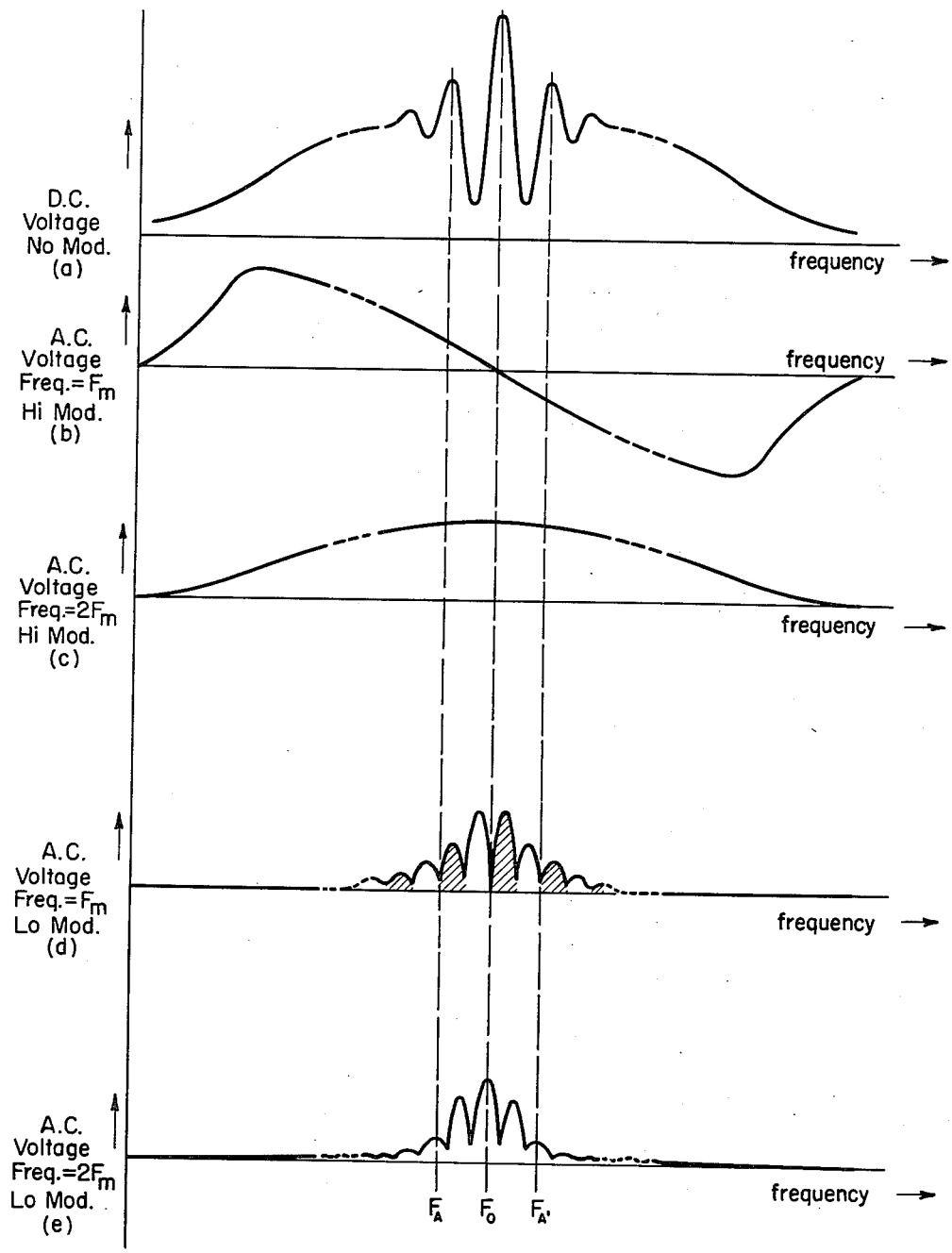
FIG. 1(e) is a graphical representation of the alternating voltage component from the beam tube detector having a frequency which is twice that of the modulating signal when the applied RF signal is as described in connection with FIG. 1(d).

With reference first to FIG. 1(a) where the detector output signal amplitude is illustrated as a function of beam tube input signal frequency, for a relatively wide band of frequencies, it will be observed that the resulting curve comprises two components, a pedestal, and a series of symmetrical perturbations superimposed thereon. The pedestal itself is known as the Rabi curve and the superimposed component is the so-called Ramsey pattern. As the central Ramsey peak is normally located at the midpoint of the pedestal, it follows that the over-all curve is symmetrical about this central peak which corresponds to the true resonance frequency of the beam tube. According to the present invention, a radio frequency (RF) signal is applied to the beam tube which is initially frequency modulated over as wide a band as that defining the pedestal. In this way a signal is obtained from the detector by reference to which it is possible to adjust the frequency of the beam tube input signal until it becomes very nearly equal to the desired resonance frequency. A more precise mode of control of the center frequency of the beam tube input signal is then initiated by decreasing substantially the modulation band-width in order to sweep only the central portion of the Ramsey pattern which is seen to exhibit a maximum at the true resonance frequency.

Figure 2:
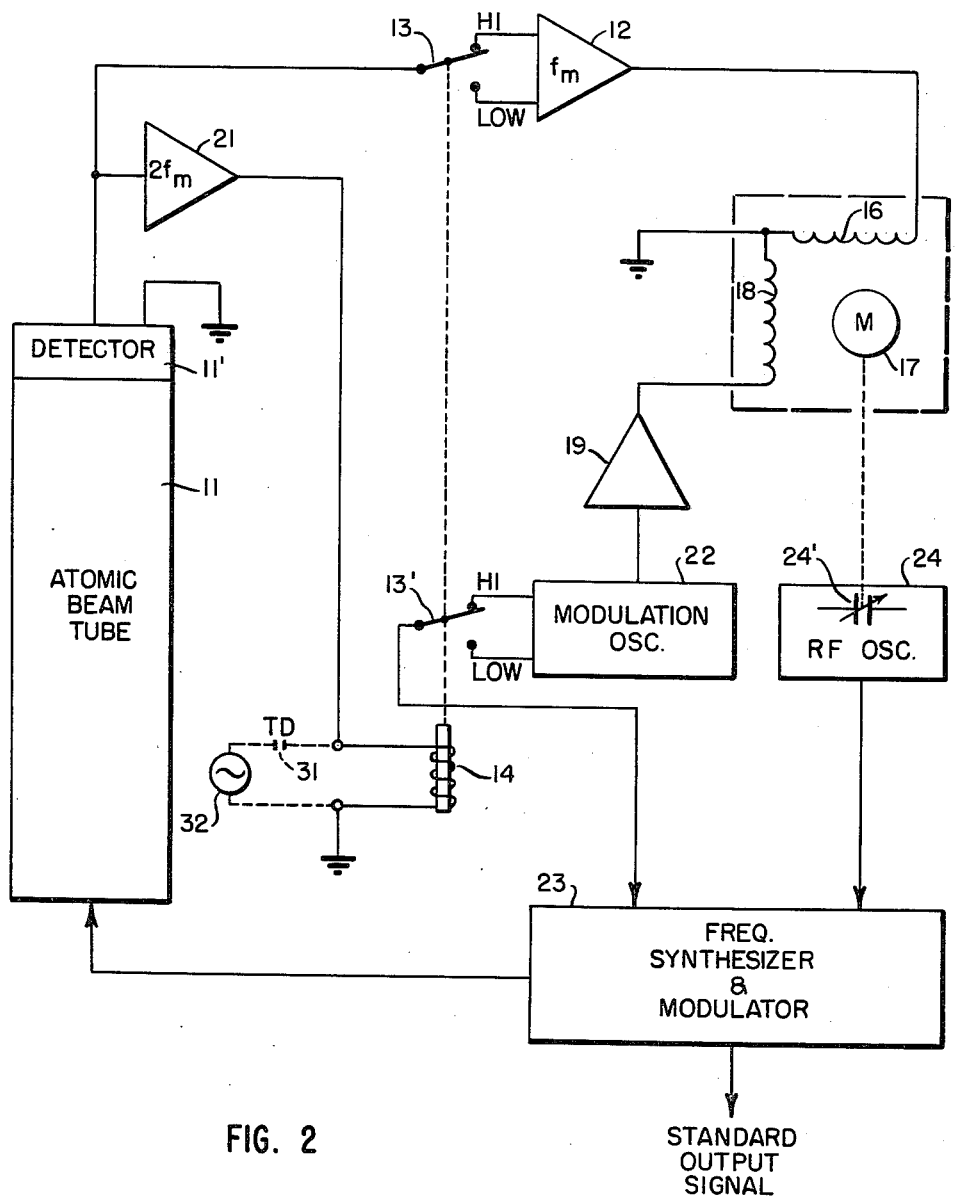
FIG. 2 is a block schematic diagram of frequency control apparatus according to the invention.

More particularly, with reference now to FIG. 2 it will be observed that the numeral 11 designates the beam tube and the numeral 11' designates the detector associated therewith. Coupled to the detector 11' is an amplifier 12 which is tuned to the modulating frequency of the R.F. signal applied to the beam tube. As shown, the amplifier 12 has high and low gain inputs which are selected in the alternative by a switch 13 whose condition is controlled by a relay coil 14. The output signal from the amplifier 12 is applied to the control winding 16 of a servo motor 17. Servo motor 17 has a reference winding 18 which is energized by an amplifier 19 for the modulating signal. The relay coil 14 is energized by a second harmonic signal from an amplifier 21 which is also coupled to detector 11' but which is tuned to twice the frequency of the modulating signal.

The modulating signal is obtained from a modulation oscillator 22 which in addition to amplifier 19 feeds a modulator and frequency synthesizer 23. By means of a switch 13', one of two modulation signal levels, a high and a low, are selected for modulation of the R.F. signal. A fly wheel oscillator 24, preferably a crystal controlled type, is used to generate the RF signal and a tunable element 24' is incorporated in the oscillator to vary its frequency. Element 24' is mechanically coupled to servo motor 17.

The function of frequency synthesizer 23 is to provide by means of various frequency multiplying, dividing, and mixing operations, two output signals bearing a fixed frequency relation to the oscillator signal. One of these signals has a useful output frequency for standard reference purposes such as one megacycle per second. The other output signal has the capability of being matched in frequency to the atomic resonance frequency of the beam tube to which it is applied. Also angle modulation, that is either phase or frequency modulation, is applied to the beam tube signal in the synthesizer.

In operation, switch 13' is initially in the high level position reflecting the initially deenergized state of relay coil 14. With high level modulation, the component of the detector output signal having the same frequency as the modulation signal is related in amplitude to the center frequency of the RF signal as shown in FIG. 1(b). That is to say, the band of frequencies swept during each modulation cycle is so large in comparison to the frequency band occupied by the Ramsey pattern, that the latter is virtually imperceptible in the detector output. Instead, because of the symmetry of the pedestal about the desired true resonance frequency, the fundamental component of the detector output exhibits a null at the resonance frequency and a gradually increasing amplitude in opposite directions either side of the null. It follows that so long as the frequency of the R.F. signal applied to the beam tube is off resonance, a finite signal is impressed upon the control winding of the servo motor which if properly related in sense to the direction of the control winding, causes the motor to turn and the oscillator frequency to change in the proper direction to minimize the frequency deviation from resonance. When the center frequency of the R.F. signal applied to the beam tube becomes very nearly equal to the beam tube resonance frequency then the control winding of the servo motor will have virtually no signal applied thereto and the motor will stop. To obtain increased sensitivity during this mode of operation when the average amplitude of the output signal from the detector is relatively small, the high gain input of amplifier 12 is selected by switch 13 with which switch 13' is ganged.

Now when the center frequency of the R.F. signal applied to the beam tube is very nearly equal to the beam tube resonance frequency, the component of the detector output signal whose frequency is twice that of the modulation signal approaches a maximum as shown in FIG. 1(c). In consequence, relay coil 14 is enabled to reverse the conditions of the switches 13 and 13' so that the R.F. signal traverses only a relatively narrow band about the central Ramsey peak. During this mode of operation with low level modulation in effect, the fundamental component of the output signal varies with frequency as shown in FIG. 1(d). Here a more steep sided curve is in evidence which necessitates the decrease in gain of amplifier 12 for proper operation of the servo motor. That is to say, motor 17 is now enabled to tune oscillator 24 very precisely to the frequency which the synthesizer converts to the resonance frequency of the beam tube, and to maintain the oscillator at that frequency.

Note, moreover, as shown in FIG. 1(e), the second harmonic component of the beam tube output at the center of the resonance curve under low modulation conditions is equal to the second harmonic amplitude in the center of the pedestal under high modulation condition. Thus relay coil 14 remains energized when the change is made from high to low. On the other hand, if synchronization is lost for any reason, the second harmonic disappears and the relay coil is deenergized. The modulation returns to a high level, and the process begins again.

In the place of the tuned amplifier 21 for energizing the relay coil 14, it is also contemplated that a time delay device might be used for this purpose. As shown in FIG. 2, a time delay switch 31 may alternatively be connected in series between the coil 14 and a separate source of power 32. When the apparatus is first placed in operation, switch 31 is open and the coil is deenergized. After a predetermined time interval sufficient for the servo motor to rough tune the oscillator very nearly to the proper frequency from which to obtain a signal at the true resonance frequency of the beam tube, then the switch 31 closes and the fine tuning operation ensues.

Various other modifications within the spirit and scope of the invention will no doubt occur to those skilled in the art. Therefore, the invention should not be deemed to be limited to the details of what has been described herein by way of illustration but rather it should be deemed to be limited only to what is claimed.

What is claimed is:

1. Frequency control apparatus for use with an atomic beam tube having a detector or the like, said apparatus comprising means for producing a radio frequency signal and applying it to said beam tube, means to produce a modulating signal of variable level for angle modulation of said radio frequency signal, means to vary the center frequency of said radio frequency signal as a function of the voltage component detected by the detector having the same frequency as the modulation signal, and means to decrease the level of said modulation signal to decrease the modulation band-width when the frequency of said radio frequency signal is in the vicinity of the true resonance frequency of the beam tube.

2. Frequency control apparatus for use with an atomic beam tube having a detector or the like, said apparatus comprising means to produce a radio frequency signal and apply it to said beam tube, means to produce a modulating signal for angle modulation of said radio frequency signal at selectable first and second levels, the modulation band-width produced by said first modulation level being substantially greater than the modulation band-width produced by said second modulation level, means to vary the center frequency of said radio frequency signal as a function of the voltage component detected by the detector having the same frequency as the modulation signal, and means for selecting said first modulation level when said modulated radio frequency signal is initially applied to said beam tube and said second modulation signal level when the frequency of said radio frequency signal is in the vicinity of the true resonance frequency of the beam tube.

3. Frequency control apparatus for use with an atomic beam tube having a detector or the like, said apparatus comprising means for producing a radio frequency signal and applying it to said beam tube, means to produce a modulating signal for angle modulation of said radio frequency signal at selectable first and second levels, the modulation band-width produced by said first modulation level being substantially greater than the modulation band-width produced by said second modulation signal level, means selectively to transmit the voltage component detected by the detector having the same frequency as the modulation signal, means selectively to transmit the voltage component detected by the detector having twice the frequency of the modulation signal, means to vary the center frequency of said radio frequency signal as a function of the transmitted voltage component having the same frequency as the modulation signal, and means for selecting said first modulation level when said modulated radio frequency signal is first applied to said beam tube and said second modulation level when the transmitted component having twice the frequency of the modulation signal exceeds a predetermined threshold value.

4. Frequency control apparatus for use with an atomic beam tube having a detector or the like, said apparatus comprising means to produce a radio frequency signal and apply it to said beam tube, means to produce a modulating signal for angle modulation of said radio frequency signal at selectable first and second levels the modulation band-width produced by said first modulation level being substantially greater than the modulation band-width produced by said second modulation signal level, means to vary the center frequency of said radio frequency signal as a function of the voltage component detected by the detector having the same frequency as the modulation signal, and means for selecting said first modulation level when the modulated radio frequency signal is first applied to said beam tube and said second level when the modulated radio frequency signal has been applied to said beam tube for a predetermined time interval.

No references cited.